United States Patent

[11] 3,630,082

| [72] | Inventor | Roland Francois Edouard Frayssinoux<br>64 Boulevard Soult, Paris, 12 eme, France |
|---|---|---|
| [21] | Appl. No. | 42,051 |
| [22] | Filed | June 1, 1970 |
| [45] | Patented | Dec. 28, 1971 |
| [32] | Priority | May 30, 1969 |
| [33] | | France |
| [31] | | 6917704 |

[54] ROTOR MEASURING DEVICE FOR FLUIDS
8 Claims, 4 Drawing Figs.

| [52] | U.S. Cl. | 73/231 R |
|---|---|---|
| [51] | Int. Cl. | G01f 1/00 |
| [50] | Field of Search | 73/194, 229–31; 415/90, 203 |

[56] References Cited
UNITED STATES PATENTS

| 2,906,121 | 9/1959 | Knauth | 73/229 |
| 1,597,334 | 8/1926 | Wilkinson | 73/229 |
| 3,276,259 | 10/1966 | Bowles et al. | 73/505 |

*Primary Examiner*—Richard C. Queisser
*Assistant Examiner*—Herbert Goldstein
*Attorney*—Pierce, Scheffler & Parker ABSTRACT: A rotor measuring device comprising a rotor rotating without any mechanical bearing in an injection box having inlet and outlet ports the axis thereof are both tangent to a virtual helix formed on the inner walls of the box, in such manner that contiguous close fluid streams will follow an helicoidal course around said body and further that the axis of said body will be set at the center of a vortex tube and said body be driven rotatively at a speed in relation to the fluid outflow.

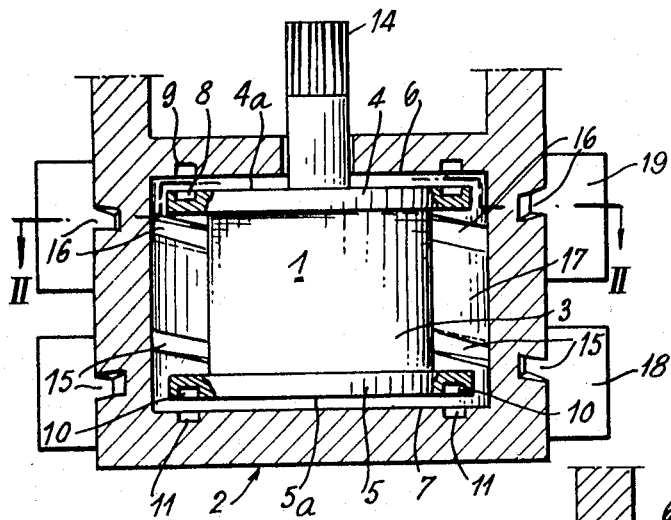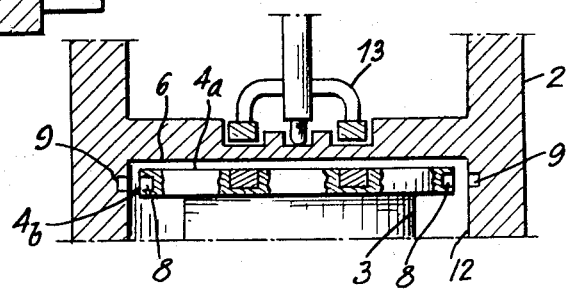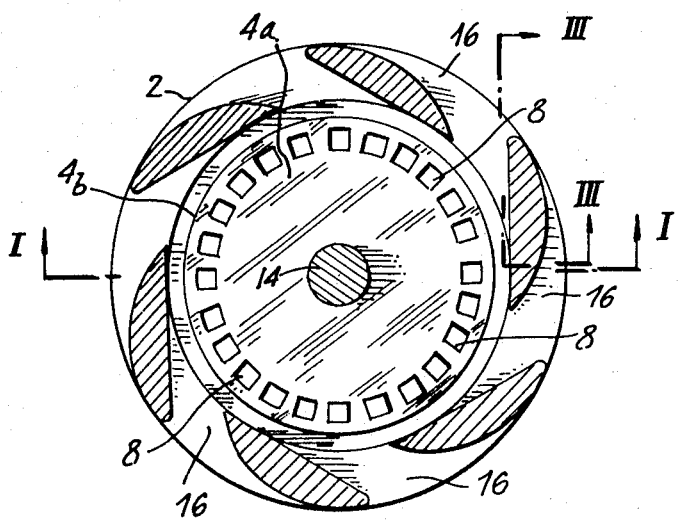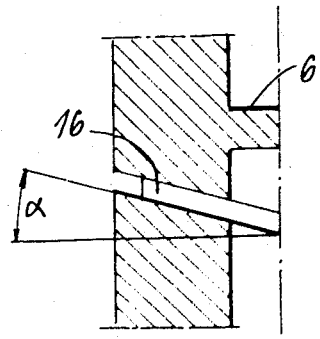

ROTOR MEASURING DEVICE FOR FLUIDS

This invention relates to an improved device for metering flowing fluids of the type made of a rotor revolving into an injection box.

Ordinary rotor measuring device, as it is known, are subject to a number of strains which slacken the starting thereof and modify the linearity thereof. Said strains are chiefly caused by resistances created by pins, as well as by a generally inadequate layout of the inlet and output ducts of fluid flows. There are undesirable effects which lessen the sensitiveness of said measuring devices, which results in their lack of accuracy as compared with other types of measuring devices, such as capsule meters, which is a serious drawback for the latter in spite of obvious advantages such as an easy designing and a small overall dimensions. Ordinary rotor measuring device, as a result, can only be used for the measurement of flows having a minimum output the value thereof may be comparatively important. As a result, the measurement range thereof is limited.

The object of this invention is to overcome the above mentioned inconveniences.

The invention consists basically in a plurality of particular arrangements relating to the relative layout of the rotor and of the box housing the rotor, said arrangements being intended to cut out disturbances generally caused by the flow of the fluid through the measuring device by allowing the fluid streams to follow a given course, to balance the forces generated by the power faces of the rotor as well as those generated by resisting faces thereof, and to provide at the rotor tips vortical outflow areas thereby ensuring the axial self-centering of the rotor.

A further object of the invention is to provide arrangements for braking the rotor by such means as power depletion or braking be proportional to the power available in the fluid.

By means of the invention, it is thus possible to cut out the subjection of pins and to work out a free rotor, radially and axially self-centered merely by the outflow of the fluid through the measuring device.

A more specific object of the invention is that, on the one hand, the rotor is made of a cylindrical body of which each tip shows an even face set opposite an even face of a box housing the rotor and, on the other hand, that said box bears inlet and outlet portholes of which the axes thereof are dipped with respect to the rotor axis, in such way that it will cause close fluid streams to wind up helically inside the ring-shaped interval situated between the rotor body and the box, said body being then set at the center of a vortex tube without any mechanical bearing.

Other features of the invention appear from the following description, which is made in connection with the accompanying drawings, with respect to specific embodiments given as nonrestrictive examples.

FIG. 1 is an axial sectional view of the measuring device along line I—I of FIG. 2.

FIG. 2 is a sectional view along line II—II of FIG. 1.

FIG. 3 is a sectional view along line III—III of FIG. 2.

FIG. 4 is a sectional view, similar to that of FIG. 1, of a measuring device according to a variant.

On FIGS. 1 and 2, is shown a rotor 1 housed into a box 2, the sidewall of rotor 1 being even.

Rotor 1 appears under the shape of a coil made of a vertical cylindrical body 3 and of two flanges 4 and 5 the diameter thereof being larger than said body. Each flange bears a flat terminal face, respectively 4a and 5a, set opposite an equally flat face, respectively 6 and 7, which demarcates the upper and lower ends of box 2.

According to the invention, rotor 1 must be balanced into the fluid to be measured in such way that the hydrostatic thrust and the center of gravity be as distant as possible from each other, said center of gravity being set as low as possible in order that the rotor will be in equilibrium into the still fluid while the floating thereof is not essential. This can be worked out by using materials having different densities, those having a higher density being obviously used at the base of rotor 1.

The condition mentioned above shall be all the more successfully carried into effect inasmuch as the actual weight of rotor 1 will be as high as possible, while the apparent weight thereof will be as low as possible, taking into account hydrostatic thrust.

Face 4a bears a number of chambers 8 arranged circularly along the periphery of said face. Said chambers are set opposite a group of identical chambers 9 worked into face 6. In the same way, a group of chambers 10 worked out into face 5a is set opposite a group of chambers 11 worked out into face 7.

According to a different embodiment shown on FIG. 4, chambers, such as 8, are worked out into the edge 4b of flange 4, and are set opposite a group of identical chambers 9 worked out into the vertical cylindrical wall 12 of box 2. On this same figure, is shown a magnetic driving device 13, of a standard type, which conveys the rotation motion of rotor 1 to a totalizer not shown. On FIG. 1, such conveying is carried out mechanically by means of a gearwheel 14 integral with rotor 1.

Box 2 bears at its base inlet ports, such as 15, and at its upper part outlet ports, such as 16, said ports being worked out into the cylindrical portion of said box. The inlet ports 15 are fed through an inlet manifold 18 and the outlet ports 16 empty into an outlet manifold 19. The axis of the ports, whose section is oblong, are dipped along an $\alpha$ angle with reference to an horizontal line (FIG. 3.). The dipping $\alpha$ and the shaping of ports 15 and 16 act in such way that, when the meter is working, the fluid streams have a rectangular section, and are besides arranged one above the other inside the ring-shaped gap 17 which is between body 3 and box 2, and, further, follow into said gap an helical course such as vertical axis of body 3 will be set at the center of a vortex tube.

The above-mentioned condition may be embodied in many ways by modifying the value of the aforementioned parameters, as well as the diameter of body 3, which amounts to calculate a spiral. Flanges 4 and 5 may also be sized in such way that forces introduced by driving faces of rotor 1 will balance those introduced by resistance faces thereof which in the case of the device described herein are faces 4a, 5a.

A concrete example of embodiment is given hereunder:

| | |
|---|---|
| Diameter of the rotor body | 32 mm. |
| Total height of rotor | 21.5 mm. |
| Diameter of flanges | 38.6 mm. |
| Thickness of flanges | 1.5 mm. |
| Diameter of box | 44.5 mm. |
| Total inner height of box | 24.5 mm. |
| Size of inlet and outlet ports | 8×4 mm. |
| Number of each type of ports (inlet, outlet) | 6 |
| Dipping of ports ($\alpha$) | 11° |

When the rotor turns into the box, on both tips of the rotor there are residual plays of 1.5 mm. filled up with a "dead" fluid, i.e. which are not or practically not renewed and forming areas wherein the outflow is eddying. Forces are then exerted on faces 4a and 5a which come into equilibrium and by which said plays are equally shared out, thereby allowing the axial self-centering of rotor 1 as a result of the sliding thereof along its rotation axis. The radial self-centering is besides carried out by the vortex effect. The "dead" fluid is used to effect the braking of the measuring device through the groups of chambers hereinabove describe and which, in the above mentioned embodiment, according to FIGS. 1 and 2, and said chambers have the dimensions indicated hereunder:

| | |
|---|---|
| Number of chambers per group | 24 |
| Cross dimensions of a chamber | 3×3 mm. |
| Depth of a chamber | 0.5 mm. |
| Diameter of the circle formed by the chambers centers | 35 mm. |

The latter dimensions depend on the inert torque which is similar to a friction of the totalizer driven by the measuring device.

A measuring device having the above-mentioned dimensions which has been used as water meter was able to measure outflows ranging between 20 and 5,000 liters of water per hour with an error in valuation lower than 2 percent, said error being reduced to 1 percent in the case the outflow did not exceed 3,000 liters per hour.

The measuring device according to the invention offers the following advantages:

The pressure losses thereof are well under those of ordinary measuring devices and may be, owing to a suitable shaping made as low as possible.

The working of the measuring device of the invention is independent of the viscosity of the fluid flowing therethrough. It is worth to recall, in this connection, that viscosity of air and water are approximately identical.

The data indicated hereinabove allow the designing of a measuring device which can work along various positions, the axis thereof being either vertical, according to the above example, either horizontal, or possibly dipped. As a matter of fact, the vortex effect causes an instant radial centering of the rotor in the box as soon as the axial centering is carried out by said residual plays filled up with "dead" fluid.

I claim:

1. A measuring device for metering flowing fluids comprising a substantially cylindrical injection box, the opposed circular faces thereof being flat, a rotor freely located in said injection box and revolvable therein, said rotor being composed of a substantially cylindrical body provided at each end with a flat terminal face opposite to and spaced from an equally flat face of said injection box, said injection box being provided with inlet and outlet ports near the respective ends thereof, the axis of said ports being tangent to a virtual helix between the inner walls of the injection box and the cylindrical walls of said rotor whereby continuous fluid streams will follow a helical course around said rotor and the axis of said rotor will be positioned at the center of a vortex without any physical bearing and said rotor will be driven rotatively at a speed relative to the fluid outflow and means being provided for measuring the rotation of said rotor.

2. A device as claimed in claim 1, wherein groups of identical recessed chambers are provided about the periphery of each end of the cylindrical rotor and each wall of the injection box, the groups of chambers being opposed to each other.

3. A device as claimed in claim 2, wherein the groups of chambers are provided in the flat face at each end of said rotor and said injection box.

4. A device as claimed in claim 2, wherein the groups of chambers are provided in the edge of each end of said rotor and said injection box.

5. A device as claimed in claim 1, wherein the circular sidewall of the rotor is smooth.

6. A device as claimed in claim 1, wherein the space between the flat end faces of said rotor and said injection box is such that the fluid filling up said space will form a laminar state.

7. A device as claimed in claim 1, wherein the center of gravity of said rotor is positioned below the hydrostatic thrust center.

8. A device as claimed in claim 1, wherein the rotor has a rotation axis at a given angle to the vertical.

* * * * *

PO-1050
(5/69)

UNITED STATES PATENT OFFICE
CERTIFICATE OF CORRECTION

Patent No. 3,630,082               Dated     December 28, 1971

Inventor(s) ROLAND FRANCOIS EDOUARD FRAYSSINOUX

It is certified that error appears in the above-identified patent and that said Letters Patent are hereby corrected as shown below:

The heading in the patent grant does not show the name of the assignee - COMPAGNIE DES COMPTEURS -.

Signed and sealed this 13th day of June 1972.

(SEAL)
Attest:

EDWARD M. FLETCHER, JR.         ROBERT GOTTSCHALK
Attesting Officer                 Commissioner of Patents